3,031,486
Patented Apr. 24, 1962

3,031,486
POLYHALOGEN CONTAINING 1-ISOTHIOCYANO-METHYL BICYCLO(2.2.1)-1,4-HEPTADIENES
Sidney B. Richter, Chicago, Ill., assignor to Velsicol Chemical Corporation, Chicago, Ill., a corporation of Illinois
No Drawing. Filed Sept. 12, 1958, Ser. No. 760,542
6 Claims. (Cl. 260—454)

This invention relates to new compositions of matter. In particular this invention relates to novel isothiocyanates.

One object of the present invention is the preparation of new compositions useful as intermediates in the production of a variety of chemical compounds.

Another object of the present invention is the production of new toxic compositions capable of controlling a wide variety of pests including insects, mites, aphids and fungi.

The novel compositions of the present invention have the unexpected and valuable property of being capable of concomitantly controlling fungi growth, insects and undesirable plant growth; i.e., they are excellent fungicides, herbicides and insecticides. These compositions have the following structural formula:

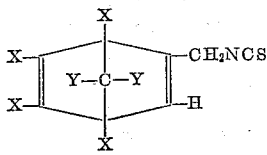

wherein X is selected from the group consisting of fluorine, chlorine, bromine and mixtures thereof; Y is selected from the group consisting of fluorine, chlorine, bromine, hydrogen and mixtures thereof.

The atoms represented by X and Y of the structural formula can be identical or dissimilar depending on the identity of the reactants.

As is apparent from the previous description, the new compositions of the present invention are unique compounds capable of a wide variety of beneficial utility. Thus these compositions are superb agricultural chemicals rendering valuable protection against a wide variety of insects, mites, aphids, fungi, lice and weeds, a combination not generally obtainable although quite desirable since it enables one to obtain protection against a wide variety of plant pests with a single application.

One method for the preparation of the compositions of the present invention is a two-step process, the first step comprising adducting a propargyl halide, such as propargyl chloride, and a polyhalogenated cyclopentadiene such as hexachlorocyclopentadiene, 1,2,3,4,5-pentachlorocyclopentadiene, 1,2,3,4-tetrachlorocyclopentadiene, hexabromocyclopentadiene, 1,2,3,4,5 - pentabromocyclopentadiene, 1,2,3,4 - tetrabromocyclopentadiene, 1,2,3,4 - tetrachloro - 5,5 - difluorocyclopentadiene, 1,2 - difluoro-3,4,55 - tetrachlorocyclopentadiene, 1,2 - dichloro-3,4,5,5-tetrabromocyclopentadiene, 1,2,3,4 - tetrabromo, 5,5-dichlorocyclopentadiene and 1,2 - dibromo - 3,4 - dichlorocyclopentadiene. The adduction is carried out under ordinary Diels-Alder conditions. The adduction product is then reacted with a thiocyanate, such as a metallic salt and the desired isothiocyanate product recovered.

The Diels-Alder adduction comprising the first step of this process can be performed in the absence of solvent, in the presence of an excess of the polyhalogenated cyclopentadiene as a solvent, or in the presence of other inert solvents. However, the use of additional solvents is neither necessary nor preferred. The adduction temperature can vary from about 20° C. to about 220° C., with the adduction time varying with the temperature utilized. Generally, the time of reaction will be between about 30 minutes to about 48 hours. Pressure is not critical and thus the adduction can be performed under atmospheric pressure, although other pressures including superatmospheric pressures are operable. Also the reaction can be operated as either a batch or a continuous process.

The second step of this process which involves the reaction of the Diels-Alder adduct formed in the first step with a thiocyanate is preferably performed in the presence of an inert solvent, such as acetone, to facilitate recovery of the product and proper control of the reaction. It is desirable to perform the reaction at temperatures between about room temperature and 150° C., with the lower temperatures being undesirable due to the relatively slow rate of reaction and the correspondingly long reaction times necessary to obtain satisfactory yields. At relatively high temperatures the new isothiocyanates of the present invention tend to rearrange and thus the present products are not obtained by said reaction.

Other methods for preparing the present compounds are possible, such as adducting propargyl isothiocyanate with the halogenated cyclopentadiene are operable and can be used to prepare these novel compounds.

The following examples describe the preparation of the compositions of the present invention.

EXAMPLE I

*Preparation of 1-Chloromethyl-3,4,5,6,7,7-Hexachlorobicyclo(2.2.1)-1,4-Heptadiene*

Hexachlorocyclopentadiene (610 grams; 2.24 mol) was placed in a three-necked glass reaction vessel equipped with thermometer, stirring means, addition funnel and a heating mantle and heated to about 110° C. Propargyl chloride (95 grams, 1.27 mol) was added to the heated hexachlorocyclopentadiene uniformly during a four hour period and then the temperature of the reaction mixture was allowed to rise to about 145° C. and maintained there for 16 hours. At the end of the reaction time, the unreacted hexachlorocyclopentadiene was removed from the reaction mixture by the use of subatmospheric pressure. The crude product was recovered by fractionation under reduced pressure as the fraction boiling at 122–140° C. at 1.7–1.9 mm. Hg pressure. This crude product was fractionated under subatmospheric pressure and the desired adduct obtained as the fraction boiling at 122° C. under 1.3 mm. Hg pressure. The refractive index of this compound at 20° C. was found to be 1.5665. The compound was analyzed for $C_8H_3Cl_7$.

|  | C | H | Cl |
|---|---|---|---|
| Theoretical | 27.64 | 0.87 | 71.46 |
| Found | 27.69 | 1.01 | 71.03 |

EXAMPLE II

*Preparation of 1-Isothiocyanomethyl-3,4,5,6,7,7-Hexachlorobicyclo(2.2.1)-1,4-Heptadiene*

1 - chloromethyl - 3,4,5,6,7,7 - hexachlorobicyclo-(2.2.1)-1,4-heptadiene (69.4 grams; 0.2 mol) potassium thiocyanate (29.2 grams; 0.3 mol) and acetone (400 milliliters) were placed in a 1-liter glass reaction vessel equipped with stirrer, reflux condenser and heating mantle. The temperature of the reaction mixture was raised to reflux temperature and the mixture allowed to reflux for 3½ hours. The reaction mixture was cooled to room temperature, filtered and the acetone solvent removed in vacuo. Then the product was dissolved in ether and washed with water. This ether layer was dried over calcium chloride, and the ether removed in vacuo, leaving the desired product which boils at 134–145° C. under 0.6 mm. Hg pressure and had a refractive index at 23° C. of 1.5988. The product was analyzed for $C_9H_3Cl_6NS$.

|  | C | H | Cl |
|---|---|---|---|
| Theoretical | 29.22 | 0.81 | 57.50 |
| Found | 29.35 | 1.00 | 58.09 |

In order to prove that the above-identified compound was the desired isothiocyanate and not the thiocyanate, the following experiment was performed with the compound prepared in Example II.

EXAMPLE III

*Preparation of 1-Methyl(Methyl Thiocarbonate)-3,4,5,6,7,7-Hexachorobicyclo(2.2.1)-1,4-Heptadiene*

Product of Example II (4 grams) was added to methanol (25 ml.) and placed in a 3-necked glass reaction flask equipped with stirrer, thermometer, reflux condenser and heating mantle and the reaction mixture heated to reflux and maintained at reflux for 16 hours. After the solution had been cooled to room temperature, water was added forming a solid precipitate. This solid was recrystallized from pentane yielding a compound having a melting point of 142–145° C. and was analyzed for $C_{10}H_7Cl_6ONS$.

|  | C | H | Cl |
|---|---|---|---|
| Theoretical | 29.88 | 1.74 | 52.92 |
| Found | 29.83 | 1.83 | 52.89 |

The formation of the thiocarbamate proves that the compound prepared in Example II was the desired isothiocyanate.

EXAMPLE IV

*Preparation of 1-Chloromethyl-3,4,5,6,7-Pentachlorobicyclo(2.2.1)-1,4-Heptadiene*

Pentachlorocyclopentadiene (533 grams; 2.24 mol) is placed in a 3-necked glass reaction vessel equipped with stirrer, thermometer, addition funnel and heating mantle and heated to about 110° C. Propargyl chloride (95 grams; 1.27 mol) is added to the heated pentachlorocyclopentadiene uniformly during a 4 hour period and then the temperature of the reaction mixture is allowed to rise to about 145° C. and maintained there for about 16 hours. Then the unreacted pentachlorocyclopentadiene is removed from the reaction mixture by the use of subatmospheric pressure. The crude product is recovered by fractionation under reduced pressure.

EXAMPLE V

*Preparation of 1-Isothiocyanomethyl-3,4,5,6,7-Pentachlorobicyclo(2.2.1)-1,4-Heptadiene*

1 - chloromethyl - 3,4,5,6,7 - pentachlorobicyclo(2.2.1)-1,4-heptadiene (62.6 grams; 0.2 mol), potassium isothiocyanate (29.2 grams; 0.3 mol) and acetone (400 ml.) are placed in a 1-liter glass reaction flask equipped with stirrer, reflux condenser, and heating mantle. The temperature of the reaction mixture is raised to reflux temperature and the mixture allowed to reflux for about 4 hours. Then the reaction mixture is cooled to room temperature, filtered and the acetone solvent removed in vacuo. The product is dissolved in ether and washed with water. The ether layer is dried over calcium chloride and the desired product recovered by removing the ether in vacuo.

EXAMPLE VI

*Preparation of 1-Chloromethyl-3,4,5,6-Tetrachlorobicyclo(2.2.1)-1,4-Heptadiene*

Tetrachlorocyclopentadiene (457 grams; 2.24 mol) is placed in a 3-necked glass reaction vessel equipped with stirrer, thermometer, addition funnel and heating mantle and heated to about 110° C. Propargyl chloride (95 grams; 1.27 mol) is added to the heated tetrachlorocyclopentadiene uniformly during a 4 hour period and then the temperature of the reaction mixture is allowed to rise to about 145° C. and maintained there for about 16 hours. Then the unreacted tetrachlorocyclopentadiene (457 grams, 2.24 mol), is removed from the reaction mixture by the use of subatmospheric pressure. The crude product is recovered by fractionation under reduced pressure.

EXAMPLE VII

*Preparation of 1-Isothiocyanomethyl-3,4,5,6-Tetrachlorobicyclo(2.2.1)-1,4-Heptadiene*

1 - chloromethyl - 3,4,5,6 - tetrachlorobicyclo(2.2.1)-1,4-heptadiene (55.7 grams; 0.2 mol), potassium isothiocyanate (29.2 grams; 0.3 mol) and acetone (400 ml.) are placed in a 1-liter glass reaction flask equipped with stirrer, reflux condenser, and heating mantle. The temperature of the reaction mixture is raised to reflux temperature and the mixture allowed to reflux for about 4 hours. Then the reaction mixture is cooled to room temperature, filtered and the acetone solvent removed in vacuo. The product is dissolved in ether and washed with water. The ether layer is dried over calcium chloride and the desired product recovered by removing the ether in vacuo.

EXAMPLE VIII

*Preparation of 1-Chloromethyl-3,4,5,6,7,7-Hexabromobicyclo(2.2.1)-1,4-Heptadiene*

Hexabromocyclopentadiene (120.8 grams; 2.24 mol) is placed in a 3-necked glass reaction vessel equipped with stirrer, thermometer, addition funnel and heating mantle and heated to about 110° C. Propargyl chloride (95 grams; 1.27 mol) is added to the heated hexabromocyclopentadiene uniformly during a 4 hour period and then the temperature of the reaction mixture is allowed to rise to about 145° C. and maintained there for about 16 hours. Then the unreacted hexabromocyclopentadiene is removed from the reaction mixture by the use of a subatmospheric pressure. The crude product is recovered by fractionation under reduced pressure.

EXAMPLE IX

*Preparation of 1-Isothiocyanomethyl-3,4,5,6,7,7-Hexabromobicyclo(2.2.1)-1,4-Heptadiene*

1-chloromethyl-3,4,5,6,7,7 - hexabromobicyclo-(2.2.1)-1,4-heptadiene (122.8 grams; 0.2 mol), potassium isothiocyanate (29.3 grams; 0.3 mol) and acetone (400 ml.) are placed in a 1-liter glass reaction flask equipped with stirrer, reflux condenser, and heating mantle. The temperature of the reaction mixture is raised to reflux temperature and the mixture allowed to reflux for about 4 hours. Then the reaction mixture is cooled to room temperature, filtered and the acetone solvent removed in vacuo. The product is dissolved in ether and washed with water. The ether layer is dried over calcium chloride and the desired product recovered by removing the ether in vacuo.

EXAMPLE X

*Preparation of 1-Chloromethyl-3,4,5,6-Tetrachloro-7,7-Difluorobicyclo(2.2.1)-1,4-Heptadiene*

1,2,3,4 - tetrachloro - 5,5 - difluorocyclopentadiene (538 grams; 2.24 mol) is placed in a 3-necked glass reaction vessel equipped with stirrer, thermometer, addition funnel and heating mantle and heated to about 110° C. Propargyl chloride (95 grams; 1.27 mol) is added to the heated tetrachlorodifluorocyclopentadiene uniformly during a 4 hour period and then the temperature of the reaction mixture is allowed to rise to about 145° C. and maintained there for about 16 hours. Then the unreacted 1,2,3,4-tetrachloro-5,5-difluorocyclopentadiene is removed from the reaction mixture by the use of subatmospheric pressure. The crude product is recovered by fractionation under reduced pressure.

EXAMPLE XI

*Preparation of 1-Isothiocyanomethyl-3,4,5,6-Tetrachloro-7,7-Difluorobicyclo(2.2.1)1,4-Heptadiene*

1-chloromethyl - 3,4,5,6-tetrachloro - 7,7 - difluorobicyclo(2.2.1)-1,4-heptadiene (62.9 grams; 0.2 mol), potassium isothiocyanate (29.2 grams; 0.3 mol) and acetone (400 ml.) are placed in a 1-liter glass reaction flask equipped with stirrer, reflux condenser, and heating mantle. The temperature of the reaction mixture is raised to reflux temperature and the mixture allowed to reflux for about 4 hours. Then the reaction mixture is cooled to room temperature, filtered and the aqueous solvent removed in vacuo. The product is dissolved in ether and washed with water. The ether layer is dried over calcium chloride and the desired product recovered by removing the ether in vacuo.

The following compositions are further exemplary of the present invention:

1-isothiocyanomethyl-3,4,5,6,7-pentabromobicyclo(2.2.1)-1,4-heptadiene
1-isothiocyanomethyl - 3,4,5,6 - tetrabromobicyclo(2.2.1)-1,4-heptadiene
1-isothiocyanomethyl - 3,4,5,6-tetrachloro - 7,7-dibromobicyclo-(2.2.1)-1,4-heptadiene
1-isothiocyanomethyl-3,4,5,6 - tetrabromo-7,7-dichlorobicyclo-(2.2.1)-1,4-heptadiene
1-isothiocyanomethyl-3,4,5,6 - tetrabromo - 7,7-difluorobicyclo-(2.2.1)-1,4-heptadiene
1-isothiocyanomethyl-3,6,7,7 - tetrachloro-4,5-dibromobicyclo-(2.2.1)-1,4-heptadiene
1-isothiocyanomethyl-3,6,7,7 - tetrabromo-4,5-dichlorobicyclo-(2.2.1)-1,4-heptadiene
1-isothiocyano - 3,6,7,7 - tetrachloro - 4,5-difluorobicyclo-(2.2.1)-1,4-heptadiene The following tests exemplify the toxicity of the present compositions.

EXAMPLE XII 1-isothiocyano - 3,4,5,6,7,7 - hexachlorobicyclo(2.2.1)-1,4-heptadiene was tested for the control of the pea aphid. The test compound was dissolved in acetone to prepare a 2% concentration and then dispersed in distilled water to concentrations of 10.0 and 1.0 p.p.m. Windson Broad Bean plants, infested with adult pea aphids, were uprooted, washed free of soil and placed in glass jars containing 100 cc. of the dispersed test compound. Aluminum foil was placed around the plant stem and jar top. The plants were maintained in the greenhouse for 72 hours, three replicates being used for each concentration. At the end of the 72 hour period, it was determined that at the 10.0 and 1.0 p.p.m. concentrations the present mortality of the pea aphids was 100%.

EXAMPLE XIII

Then the 1 - isothiocyano - 3,4,5,6,7,7 - hexachlorobicyclo(2.2.1)-1,4-heptadiene was tested as a miticide. Again the compound was dissolved in acetone to prepare a 2% concentrate which was dispersed in distilled water at a concentration of 10.0 and 1.0 p.p.m. Cranberry bean plants, infested with two-spotted spider mites, were uprooted, washed free of soil and placed in glass jars containing 100 cc. of the dispersion (three replicates at each concentration). The test plants were maintained in the greenhouse for 3 days, the percent mortality of the mites found to be 42.4 at the 10 p.p.m. concentration and 38.6 at 1.0 p.p.m.

EXAMPLE XIV

Herbicidal tests were performed with 1-isothiocyanomethyl-3,4,5,6,7,7 - hexachlorobicyclo(2.2.1) - 1,4-heptadiene. The test compound was formulated into a 10% wettable powder, dispersed in water to a concentration of 2000 p.p.m. and applied to the foliage of 4 week old potted tomato plants, Bonny Best variety, by dipping therein. Three replicates were used, all of the treated plants being held under greenhouse conditions for 7 days, provided with subterranean watering and observed for response to treatment for 7 days. At that time the test plants were dead. Tomato plants are customarily used to determine the herbicidal properties of a compound due to their similarity to certain undesired plants.

EXAMPLE XV 1-isothiocyanomethyl - 3,4,5,6,7,7 - hexachlorobicyclo-(2.2.1)1,4-heptadiene was tested to control the bean rust by spraying pinto bean seedlings with the test compound at concentrations of 100 and 1000 p.p.m. The plants were allowed to dry, inoculated with spore suspensions of the bean rust organism (*Uromyces phaseoli*) and placed in an incubation chamber for 24 to 48 hours. Plants were then removed and maintained under greenhouse conditions for 10 to 14 days. Three replicates were used for each concentration. The percent control was 100% at 1000 p.p.m. and 83% at 100 p.p.m.

EXAMPLE XVI

The toxicity of 1-isothiocyanomethyl-3,4,5,6,7,7-hexachlorobicyclo(2.2.1)-1,4-heptadiene to various spores was determined by the slide germination technique. Measured concentration of spores were placed on glass slides in contact with different concentrations of the test compound. Percentage germination of the spores was then determined for each treatment after 24 hours incubation at 72° F.

| Spore | Conc., p.p.m. | Percent Spore Germination |
|---|---|---|
| *F. Roseum* | 100 | 10 |
| Do | 1,000 | 0 |
| *M. Fructicola* | 1 | 7 |
| Do | 10 | 0 |
| Do | 100 | 0 |
| Do | 1,000 | 0 |

The toxicity of the present compositions as indicated by the above test results against such a wide variety of noxious organisms and plants is indeed unexpected but certainly beneficial since it allows for the control of numerous plant pests with a single application. It is to be understood that the present compositions are effective against many other fungi, insects, etc., since the above results are merely exemplary of the usefulness of the present compositions.

When being used as an agricultural chemical as is customary in the field, the present compound can be formulated in numerous ways depending on the specific intended use. Thus it can be combined with various liquid and solid inert carrier materials (such as acetone, kerosene, diatomaceous earth), emulsifiers, dispersing agents, stickers, wetting agents, and other such additives known to the formulation art. They may be formulated into dusts, granulars, wettable powders, emulsions and the like. The formulations can be sprayed, dusted, dipped or otherwise applied to the plants, environment surrounding the material being protected or onto the undesired fungi, insect, mite, weed, etc. Typical formulations are:

EXAMPLE XVII

Percent by weight
Composition of Example II _____ 50
Celite 209 _____ 50

"Celite 209" is a diatomaceous earth utilized as a relatively inert carrier material. This formulation may be ground into a dust or granular.

EXAMPLE XVIII

| | Percent by weight |
|---|---|
| Composition of Example V | 70 |
| Micro Cel 800 | 27 |
| Triton X-100 | 3 |

"Micro Cel 800" is a synthetic, relatively inert, porous carrier material consisting substantially of calcium silicate. "Triton X-100" is a wetting agent, chemically an alkyl, aryl polyether alcohol. This formulation is a wettable powder suitable for slurry-type treatment.

EXAMPLE XIX

| | Percent by weight |
|---|---|
| Composition of Example VII | 60 |
| Isopropyl acetate | 23 |
| Isopropyl alcohol | 10 |
| Atlas G-1690 | 7 |

"Atlas G-1690" is an emulsifier essentially a nonylphenolethylene oxide detergent. This formulation is an emulsifiable concentrate.

If desired these compositions can be utilized in conjunction with other pest and plant control agents and in various other forms generally known to the art.

In addition to the afore-indicated utility the present compositions have beneficial utility as intermediates in the preparation of other highly valuable compounds particularly thiocarbamates and thioureas, although they can be used in the preparation of still other halogenated, bicyclic compounds, including the formation of dithioketocyanidines by reaction with N-Alkyl Schiff bases, preparation of thiazolidines by reaction with halogen substituted acids, the formation of thiocarbonilides by reaction with aromatic hydrocarbons or phenol ethers, preparation of thioacid amides by reaction with polyhydric phenols, and the formation of disulfazolidone tribromides by reaction with bromine and the preparation of the isocyano dichlorides by reaction of the present compounds with chlorine. Of course, many other valuable compounds can be made from reactions of the present compositions.

Also, these compositions are excellent resin intermediates, useful in the preparation of protective films and coatings, dyes, fire resistance additives, gelling agents, dispersants useful in the preparation of adhesives, varnishes and paints, as resin modifiers, as adsorbents and many other uses.

What is claimed in this invention is:

1. 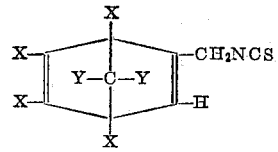

where each X is independently selected from the group consisting of fluorine, chlorine and bromine; and each Y is independently selected from the group consisting of fluorine, chlorine, bromine and hydrogen.

2. 1 - isothiocyanomethyl - 3,4,5,6,7,7 - hexachlorobicyclo(2.2.1)-1,4-heptadiene.

3. 1 - isothiocyanomethyl - 3,4,5,6,7 - pentachlorobicyclo(2.2.1)-1,4-heptadiene.

4. 1-isothiocyanomethyl - 3,4,5,6 - tetrachlorobicyclo-(2.2.1)-1,4-heptadiene.

5. 1-isothiocyanomethyl - 3,4,5,6,7,7 - hexabromobicyclo(2.2.1)-1,4-heptadiene.

6. 1-isothiocyanomethyl - 3,4,5,6 - tetrachloro-7,7-difluorobicyclo(2.2.1)-1,4-heptadiene.

References Cited in the file of this patent

UNITED STATES PATENTS

| 2,352,606 | Alder et al. | July 4, 1944 |
| 2,376,105 | Williams | May 15, 1945 |
| 2,393,746 | Bruson | Jan. 29, 1946 |
| 2,394,584 | Bruson | Feb. 12, 1946 |
| 2,429,099 | Ladd | Oct. 14, 1947 |
| 2,744,924 | Herzfeld | May 8, 1956 |
| 2,793,975 | Mark | May 28, 1957 |
| 2,819,197 | Santmyer | Jan. 7, 1958 |
| 2,909,458 | Richter | Oct. 20, 1959 |

OTHER REFERENCES

Chemical Abstracts, vol. 39, Dec. 20, 1945, No. 24, pages 5884-5885.